Dec. 22, 1953
J. FENLEY
2,663,386
AUTOMATIC BRAKE RELEASE
Filed March 11, 1949
4 Sheets-Sheet 1
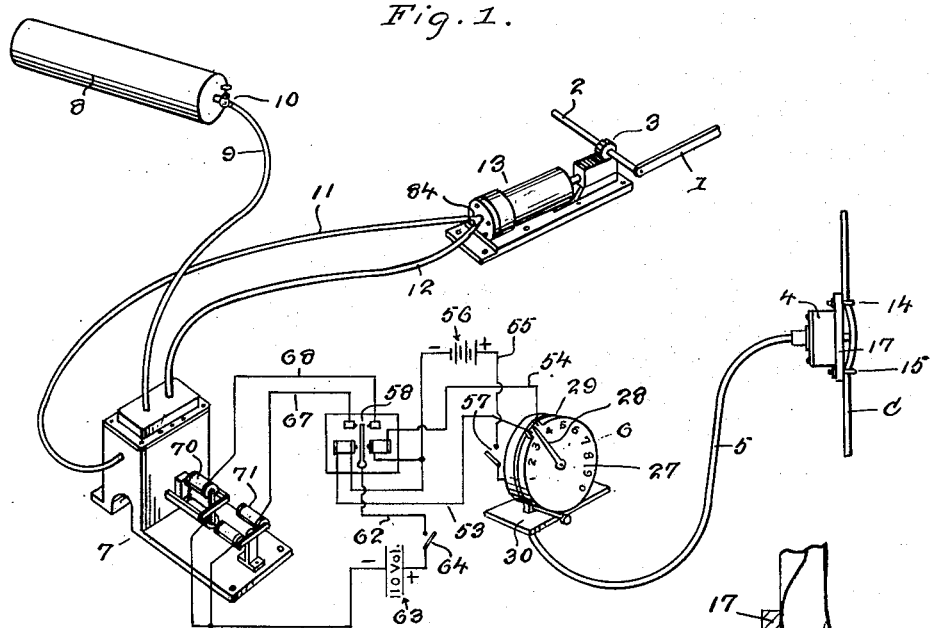
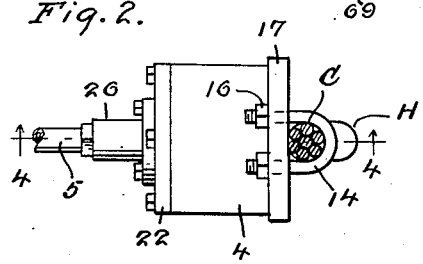
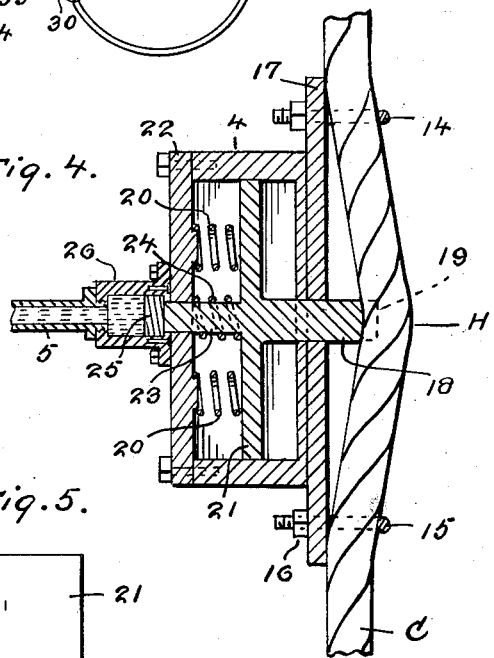
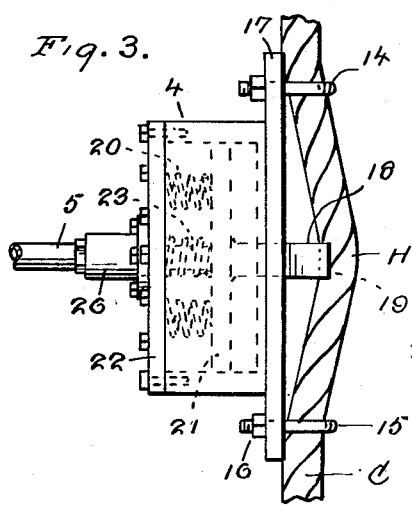
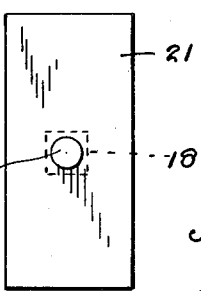
INVENTOR.
Jack Fenley
BY *Victor J. Evans & Co.*
ATTORNEYS

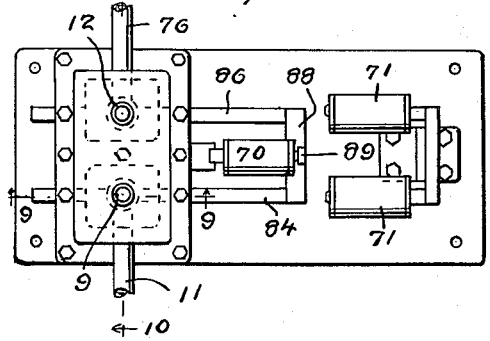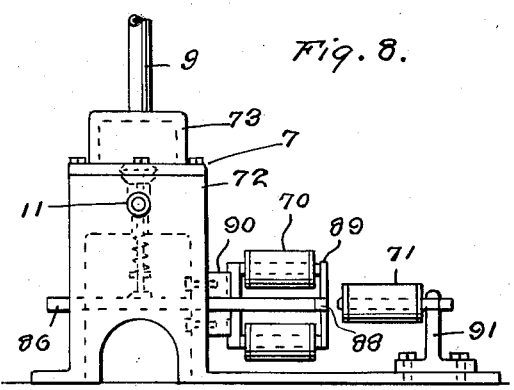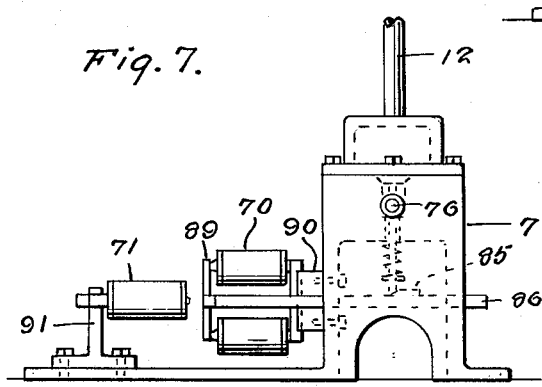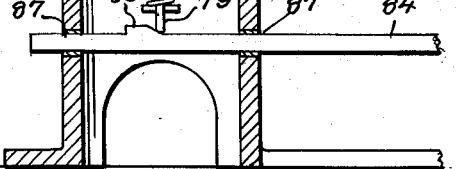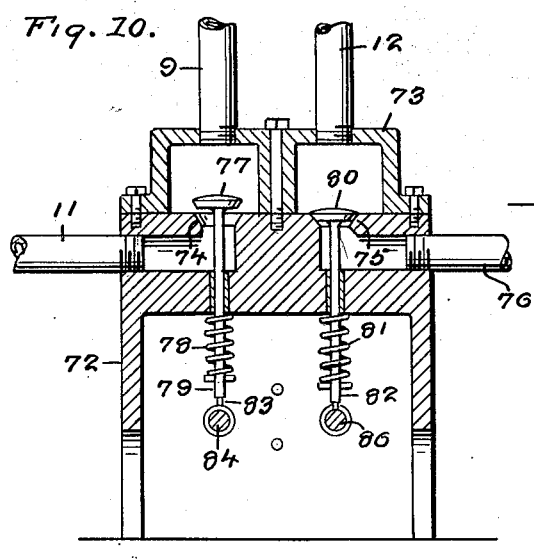

Dec. 22, 1953    J. FENLEY    2,663,386
AUTOMATIC BRAKE RELEASE
Filed March 11, 1949    4 Sheets-Sheet 3
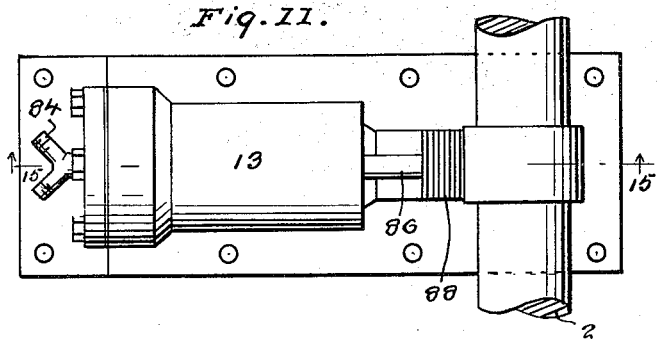
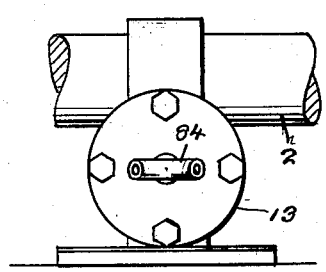
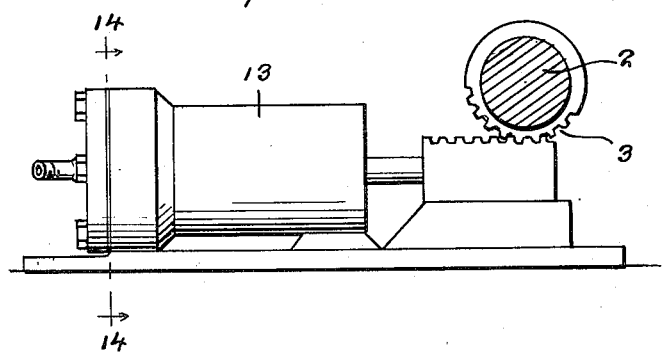
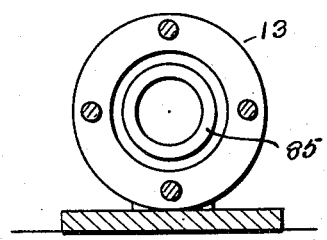
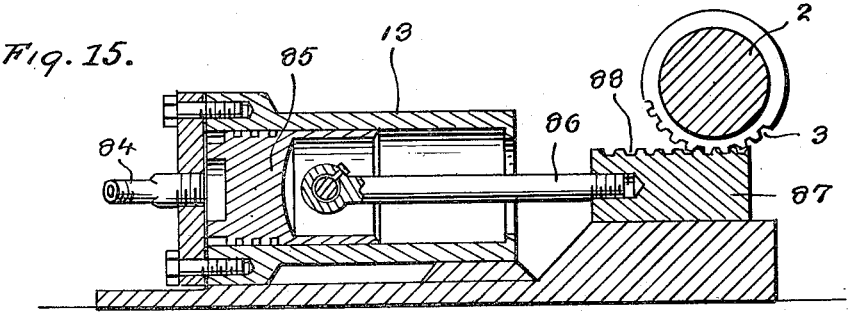
INVENTOR.
Jack Fenley
BY Victor J. Evans & Co.
ATTORNEYS Dec. 22, 1953   J. FENLEY   2,663,386
AUTOMATIC BRAKE RELEASE
Filed March 11, 1949   4 Sheets-Sheet 4
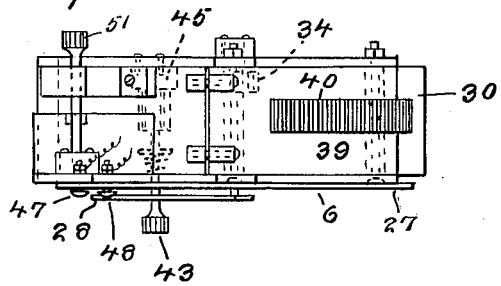
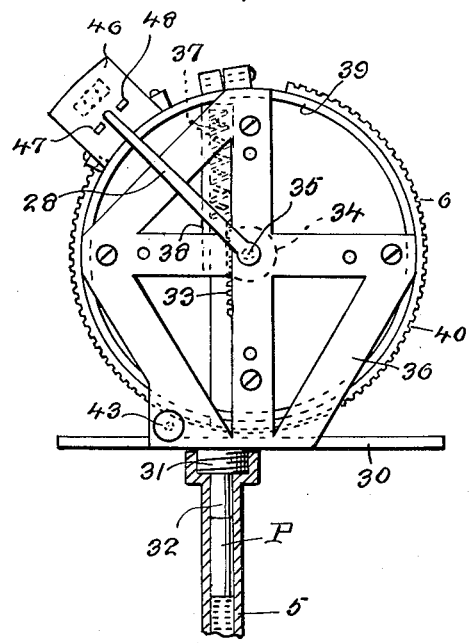
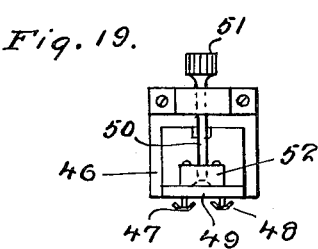
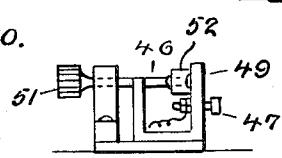
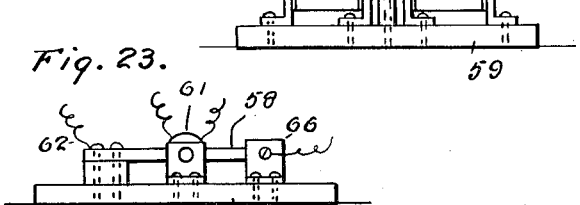
INVENTOR.
Jack Fenley
BY Victor J. Evans & Co.
ATTORNEYS Patented Dec. 22, 1953

2,663,386

UNITED STATES PATENT OFFICE 2,663,386

AUTOMATIC BRAKE RELEASE

Jack Fenley, San Bernardino, Calif.

Application March 11, 1949, Serial No. 80,883

6 Claims. (Cl. 188—110)

My present invention relates generally to the broad class of earth boring and oil well drilling, and more specifically to an automatic brake release for well-drilling rigs which while well adapted for various other uses, is especially designed for use with rotary drills having a rotary brake drum for the drill cable and braking mechanism for governing the movement of the drum, and the feed of the cable carried by the drum, in order to accurately pay out the cable as the drilling operation progresses. In addition to the automatic brake release mechanism for governing the brake drum and cable-feed, a tension device responsive to motion of the drill cable co-acts with a motive fluid indicator for measuring the feed of the drill with relation to existing conditions of the geological formation through which the well is being drilled, and pneumatic and electrical appliances are employed for automatic control of the brake governing and control mechanism.

The invention includes a minimum number of standard parts that may with facility be manufactured at low cost of production, and the parts may be assembled with convenience and installed in combination with the standard types of drilling rigs to increase the efficiency and the amount of work performed by the drilling rig, eliminate the necessity for constant inspection by the driller of the working conditions, and to assure the constantly required weight upon the drill pipe for accurate drilling operations.

The invention consists in certain novel features of construction and combinations and arrangements of parts as will hereinafter be described and more particularly set forth in the appended claims.

In the accompanying drawings I have illustrated a complete example of a physical embodiment of my invention in which the parts are combined and arranged in accord with one mode I have devised for the practical application of the principles of the invention. It will however be understood that changes and alterations are contemplated and may be made in these exemplifying drawings and structures, within the scope of my claims, without departing from the principles of the invention.

Figure 1 is a perspective view showing a diagrammatic lay-out of the equipment of the invention, between the drill cable and the brake operating mechanism.

Figure 2 is a top plan view showing the tension-controlled fluid pressure operated hydraulic servo-motor attached to the drill cable for operating the weight indicator.

Figure 3 is a view in side elevation of the servo-motor responsive to the tension of the cable; and Figure 4 is a vertical sectional view at line 4—4 of Fig. 2.

Figure 5 is a face view of the compressor head or plate of the hydraulic servo-motor as seen in Fig. 4.

Figure 6 is a plan view of the electromagnetically controlled pneumatic governor or valve mechanism for controlling operation of the brake-operating motor; Figure 7 is a right side view; and Figure 8 is a left side view of the appliance in Fig. 6.

Figure 9 is a vertical sectional view at line 9—9 of Fig. 6; and Figure 10 is a sectional detail view at line 10—10 of Fig. 6.

Figure 11 is a top plan view of the pneumatic motor for operating the brake release mechanism; and Figure 12 is a view in side elevation thereof.

Figure 13 is an end elevation as seen from the left in Fig. 11; and Figure 14 is a transverse vertical sectional view at line 14—14 of Fig. 12.

Figure 15 is a vertical longitudinal sectional view through the pneumatic motor for the brake mechanism.

Figure 16 is a top plan view of the hydraulically operated stress or weight indicator with electrical contacts and controls for the pneumatic governor.

Figure 17 is a side view; and Figure 18 is a front view of the indicator with the dial face removed for convenience of illustration.

Figures 19 and 20 are detail views detached of the retracting screws and their mounts.

Figure 21 is a top plan view of the electromagnetically operated control switch; Figure 22 is a front view; and Figure 23 is a right hand side view of the switch mechanism.

In order that the general arrangement and utility of parts of the equipment may readily be understood I have shown in the diagrammatic view of Fig. 1 the dead-end portion of the cable C that is anchored to a suitable support adjacent the drill rigging. From the dead end the cable as usual passes upwardly and over the customary suspending sheaves to and around a rotary winding drum that is controlled by usual braking mechanism actuated by an operating lever 1 mounted on a rock shaft 2, and rocked by a pinion 3, as will be described, to control the feed of the cable and drill as the latter progresses through the formation at appropriate speeds with relation to the character of the formation.

In this diagram the installation of the equipment includes a prime mover or tension actuated hydraulic compressor indicated as a whole by the numeral 4 attached to the cable, and which is connected by hose 5 to a weight or stress indicator 6, and the operation of the indicator, through electrical power circuits and appliances, electro-magnetically controls a governor or pneumatic valve mechanism 7. The pneumatic governor receives a supply of compressed air from a reservoir 8 through a hose 9 under control of a hand valve 10, and the governor is connected by air hose 11 and 12 to a pneumatic brake-motor 13 that turns the pinion 3 and rock shaft 2 to apply and release the braking mechanism of the cable drum.

The tension actuated hydraulic or fluid pressure servo-motor 4 is frictionally mounted upon the cable C by means of a pair of vertically spaced U-bolts 14 and 15 encircling the cable and in frictional contact therewith and the bolts are fastened by nuts 16 to the face plate 17 of the compressor 4. The cable under tension of weight by the drill is distended by means of a central horizontal post 18 terminating at its outer free end in a concave saddle 19 against which lies the tension stretch or hump of the cable. This post or bar 16 is slidably mounted in a bearing bore of the compressor wall, and it is resiliently held in constant contact with the cable by means of a pair of springs 20, 20 interposed between an interior presser plate 21 integral with the post and the detachable end plate 22 of the tension portion of the compressor or servo-motor.

The presser plate 18 is fashioned with an integral plunger 23 alined with the post 18, a compression spring 24 is interposed between the presser plate and the end plate, and the plunger, which is slidable in a bearing bore of the end plate is provided at its end with a plunger head 25 that is reciprocably mounted in a fluid pressure chamber formed in a casing 26 bolted to the exterior face of the end plate of the servo-motor.

As the weight of the drill mechanism tends to straighten the hump H or tension stretch of the cable it will be apparent that the tension created on the cable will force the plunger 25 through chamber 26 to create fluid pressure through the hose 5 to the weight or stress indicator 6 for actuating the indicator. In Fig. 1 the indicator is equipped with a measuring dial plate 27 and pointer 28, and the operating parts of the indicator are enclosed within a casing 29 mounted upon a horizontal base 30 that is supported in desirable position adjacent the drilling mechanism.

The hose 5 is coupled to a nipple 31, see Fig. 18, fixed to the base 30, and the smooth lower end 32 of an upright rack bar 33 is reciprocably mounted in the nipple and the coupling for co-action of the rack bar with a pinion 34 rigidly mounted on the arbor 35 of the pointer 28, the arbor being journaled in bearings of a frame 36 fixed to the base plate 30.

To eliminate the necessity for replacing the entire fluid content of the hose 5 in case of loss or accidental damage, a floating piston P is confined within the hose below the rackbar 32. A spring 37 is mounted above the rack bar in a tubular guide 38 for resiliently holding down and retracting the rack bar as the rack bar moves in response to the fluctuating pressure of the motive fluid against the piston P and the lower end of the rack bar, to turn the pinion 34 and actuate the pointer or indicator hand 28.

For setting the indicator a circular locating rim 39 is employed having an external gear ring 40, and a pinion 41 is journaled with its shaft 42 and hand knob 43 in the lower portion of the fixed frame 36, to actuate or adjust the indicator. A spring 44 resiliently holds the drive pinion 41 in position, and a locking detent 45 retains the indicator in desired adjusted position.

In addition to its customary function of measuring and indicating the weight or stress of the cable, the assembly of the pointer 28 forms part of a circuit maker that co-acts with a differential relay switch in the equipment of the electrical governor and valve mechanism 7 for controlling the brake motor 13.

The circuit maker 46 as a whole is rigidly mounted on the exterior periphery of the adjustable rim 39 of the indicator, with a pair of terminal contacts 47 and 48 initially spaced at opposite sides of the free end of the pointer 28, to form stationary contacts for the movable contact member or pointer 28. These stationary contacts or terminals are mounted on the insulated base 46 in an adjustable bracket 49, and a retracting screw 50 with its hand knob 51 is connected by dog 52 to the bracket for adjusting the contacts 47 and 48 with relation to the movable contact member or pointer 28.

In Fig. 1 the two stationary contacts provide terminals for wires or conductors 53 and 54 of the switch-control circuits, and wire 55 attached to the pointer assembly, with its battery 56 and cut out hand switch 57, completes the two circuits for a differential relay switch that controls the electrical governor 7. In Figs. 21, 22, and 23 the differential relay switch includes a resilient blade or armature 58 mounted upon an insulating base 59 between the two opposed electro-magnets 60 and 61, and the armature is included in a main circuit 62 having a source of energy 63, and the usual cut out switch 64.

The armature 58 is located between two stationary terminals or contacts 65 and 66 of the governor operating circuits 67 and 68, and these circuits are completed back to the source of energy by conductor 69.

The operating circuit 68 includes a pair of electro-magnets or solenoids 70, 70, that are instrumental in actuating the pneumatic governor and operating the brake motor and lever to release the brake of the cable-drum; and the circuit 67 includes another set of solenoids 71, 71 that are instrumental in activating the pneumatic governor and thus operating the brake motor and lever mechanism for restoring the released brake to normal operating position.

In the detail views Figs. 6 through 10, the pneumatic governor indicated as a whole by the numeral 7 includes a valve casing 72 having a hollow head 73 forming separate air chambers for intake and exhaust of air, and the casing is equipped with a valve seat 74 in the intake chamber which communicates by pipe 9 with the compressed air reservoir 8 and a power or pressure pipe 11 that supplies air under pressure to the pneumatic motor for the brake mechanism.

The valve casing is also provided with a valve seat 75 opening from the return pipe 12 of the pneumatic motor through an exhaust air chamber in the head to an exhaust pipe 76 from the valve casing.

An intake valve 77, which is resiliently held closed in its seat by spring 78 coiled about its stem 79, may be opened as shown in Fig. 10 to permit flow of air under pressure through pipe 11 to actuate the brake motor for releasing the brake of the cable drum.

An exhaust valve 80 is resiliently held closed in its seat by spring 81 coiled about its stem 82, and this valve may be lifted or opened to permit exhaust of the motive fluid from the pneumatic motor through pipe 12, thence through the valve casing to and through the exhaust pipe 76.

Valve 77 is opened and lifted from its seat by means of a cam 83 carried by a reciprocating cam rod 84, and the exhaust valve is uplifted and opened by means of an oppositely arranged and acting cam 85 on a parallel cam rod 86.

These horizontally disposed twin rods 84 and 86 are reciprocably mounted in slide bearings 87 of the valve casing 72, and at one end they are rigidly united by a cross head 88 forming an armature for the two horizontally arranged solenoids 71, 71; and this cross head or armature is equipped with an upright armature 89 for the two vertically arranged solenoids 70, 70.

Solenoids 70 are mounted at 90 on the exterior face of one side of the valve casing 72, and the spaced horizontal solenoids 71, 71, are mounted in a bracket or holder 91 rigid with the base of the valve casing, in alinement with the cruciform armature 88—89 of the two pairs of solenoids.

As the drilling progresses and the well is deepened weight, load, or stress is accumulated or increased on the suspending cable to a point where the hydraulic compressor is activated for turning the pointer or movable contact of the indicator clockwise to engage the stationary contact 48.

The circuit maker thus closes the switch circuit 54 and the differential relay switch 58 completes the operating circuit 68 for energizing the solenoids 70, 70; the solenoids draw the twin cam rods to position where the cam 83 by contact with stem 79 lifts valve 77 from its seat, while valve 75 remains closed, as in Fig. 10. Under these conditions air under pressure from pipe 9 flows through pipe 11 to the brake motor 13 which serves to lift the brake operating or release arm 1 to release the brake from the cable drum, thus relieving the excess load-stress from the cable.

After the strain on the cable is thus released, the presser plate of the hydraulic compressor is projected by springs 20, pressure under rack bar 32 is released, and this bar is depressed by its spring 37 for imparting a swinging movement, counterclockwise, to the pointer or movable contact of the circuit closer. This movement opens the switch circuit 54, and closes the switch circuit 53 to swing the differential switch or relay 58 to close operating circuit 67 and energize the solenoids 71, 71. The energized solenoids draw the twin cam rods to position for opening valve 80, and permitting closure by spring 78 of the valve 77 to cut off the supply of compressed air to the pneumatic brake release motor. The opened valve 80 permits exhaust of air pressure from the pneumatic motor 13 through pipe 12 to the exhaust pipe 76, thus allowing the brake lever to fall back into holding position of the brake on the cable drum.

As the well drilling progresses, this cycle of operation is intermittently repeated, letting off the drilling mechanism to a predetermined suspended weight, for automatically maintaining the drilling mechanism in precise condition for efficient well drilling.

The pneumatic brake release motor 13 may be of usual type and it includes a Y-connection 84 for the pressure pipe or hose 11 and the exhaust pipe or hose 12, to the cylinder of the motor, and a reciprocating piston 85 within the cylinder. The piston is connected by its rod 86 to a slide 87 having a rack 88 that engages the pinion 3 of the brake release lever 1, for performing the functions heretofore described.

Having thus fully described my invention, what I claim as new and desire to secure by Letters Patent is:

1. In an automatic brake release for a well-drilling rig including a suspending cable, a brake releasing mechanism, a tension actuated hydraulic compressor mounted on and responsive to pressure from the cable, a pneumatic brake motor for the brake releasing mechanism, a governor for the pneumatic brake motor, an intake and an exhaust valve for the governor, a pair of cam-rods and coacting means for opening and closing the respective valves, and electro-magnetic operating means for reciprocating said cam-rods, the combination with a circuit maker, a weight-indicator having a conduit connection with said compressor whereby said weight-indicator is activated by the compressor and a movable member for the weight indicator forming a movable contact for the circuit maker, of a switch-control circuit including said movable contact and circuit maker, an operating electric circuit for the operating means of the governor, and a switch for connecting the switch circuit and the operating circuit.

2. In an automatic brake release for a well-drilling rig including a suspending cable, a brake release mechanism, a tension activated hydraulic compressor mounted on and responsive to pressure from the cable, a pneumatic brake motor for the brake release mechanism, a pneumatic governor for the motor, an intake and an exhaust valve for the governor, a pair of cam-rods and coacting means for opening and closing the respective valves, an electric operating circuit and electro-magnetic means therein for reciprocating said cam-rods and a switch circuit for the operating circuit, the combination with a circuit maker for the switch circuit, a weight-indicator having a conduit connection with said compressor whereby said weight-indicator is activated by the compressor and a movable member for the weight indicator forming a movable contact for the circuit maker, and a relay switch mechanism for connecting the switch circuit and the operating circuit for the governor.

3. In an automatic brake release for well-drilling rigs including a suspending cable, a pneumatic brake motor for operating the brake release, a governor for the motor, an intake and an exhaust valve for the governor, a pair of cam-rods and coacting means for opening and closing the respective valves, an electric operating circuit and electro-magnetic means for reciprocating said cam-rods, the combination with a hydraulic compressor having a pressure plate which is mounted on and responsive to pressure from the cable, and a weight-indicator activated by the compressor, of a switch control circuit and a relay switch for connecting this circuit with the operating circuit, a circuit maker for the switch circuit, and a movable pointer for the indicator forming the movable contact member of the circuit maker.

4. In an automatic brake release mechanism for a well-drilling rig including a suspending cable, a brake release mechanism, a pneumatic brake motor for the release mechanism, and means including an electrical switch circuit instrumental in operating the motor, the combination with a tension activated hydraulic compression having a pressure plate mounted on and responsive to pressure from the cable, of a governor for the motor, an intake and exhaust valve in said governor, a pair of cam-rods and coacting means for opening and closing the respective valves, electro-magnetic means for reciprocating said cam-rods, a weight-indicator having a conduit connection with said compressor whereby said weight-indicator is activated by the compressor and a movable pointer for the indicator forming a movable electrical contact, a fixed contact in the switch circuit for co-action with the pointer, and a control switch adapted to be closed in the switch circuit.

5. In an automatic brake release mechanism for a well-drilling rig including a suspending cable, a brake release mechanism, and a pneumatic motor for the release mechanism, the combination with a governor for the motor having an intake and an exhaust valve, of a pair of cam-rods and coacting means for opening and closing the respective valves, electro-magnetic means for reciprocating said cam-rods, a tension actuated hydraulic compressor having a pressure plate mounted on and responsive to pressure from the cable, an electrical switch circuit for operating the compressor, a weight-indicator relay switch connected to the said governor and intermediate means for controlling the electromagnetic means.

6. In an automatic brake release mechanism for a well-drilling rig including a cable, a brake release mechanism, a pneumatic motor for the release mechanism, and a tension actuated hydraulic compressor having a pressure plate mounted on and responsive to the pressure from the cable, the combination with a governor for the motor having a spring pressed air intake valve and a spring pressed exhaust valve, of a pair of rods having a pair of oppositely arranged cams thereon for co-action with the respective valves, a cross head uniting said rods and forming an electric armature, an operating electric circuit and a solenoid therein for co-action with the armature, and intermediate means actuated by the compressor for energizing the solenoid.

JACK FENLEY.

References Cited in the file of this patent
UNITED STATES PATENTS

| Number | Name | Date |
|---|---|---|
| 1,779,656 | Brauer | Oct. 28, 1930 |
| 1,834,894 | Blankenship et al. | Dec. 1, 1931 |
| 1,926,119 | Smith | Sept. 12, 1933 |
| 1,954,670 | Hawk | Apr. 10, 1934 |
| 2,080,804 | Brantly | May 18, 1937 |
| 2,117,078 | Brauer | May 10, 1938 |
| 2,298,222 | McShane | Oct. 6, 1942 |
| 2,327,505 | Conrad et al. | Aug. 24, 1943 |